United States Patent
Soderlind

(10) Patent No.: US 9,630,644 B2
(45) Date of Patent: Apr. 25, 2017

(54) METHOD AND SYSTEM FOR STOWING STEERING COLUMN IN AN AUTONOMOUS VEHICLE

(71) Applicant: Ford Global Technologies, LLC, Dearborn, MI (US)

(72) Inventor: Erik William Soderlind, Harrison Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/991,535

(22) Filed: Jan. 8, 2016

(65) Prior Publication Data

US 2016/0121918 A1 May 5, 2016

Related U.S. Application Data

(63) Continuation-in-part of application No. 13/848,097, filed on Mar. 21, 2013.

(51) Int. Cl.
| | |
|---|---|
| *B62D 1/181* | (2006.01) |
| *B62D 1/183* | (2006.01) |
| *B62D 1/19* | (2006.01) |

(52) U.S. Cl.
CPC .............. *B62D 1/181* (2013.01); *B62D 1/183* (2013.01); *B62D 1/197* (2013.01)

(58) Field of Classification Search
CPC ...... B62D 5/04; B62D 5/0409; B62D 5/0403; B62D 5/0406; B62D 1/181; B62D 1/183
USPC ........... 280/771, 775, 776, 777, 779; 74/493
See application file for complete search history.

(56) References Cited

U.S. PATENT DOCUMENTS

| | | | |
|---|---|---|---|
| 4,208,927 A | 6/1980 | Kennis | |
| 4,503,504 A * | 3/1985 | Suzumura | B60R 1/07 280/775 |
| 9,168,944 B2 | 10/2015 | Bertet et al. | |
| 2009/0308189 A1* | 12/2009 | Tomaru | B62D 1/181 74/89.42 |
| 2012/0174695 A1 | 7/2012 | Bertet et al. | |
| 2014/0028008 A1* | 1/2014 | Stadler | B62D 1/192 280/777 |
| 2015/0191198 A1 | 7/2015 | Perichon et al. | |

* cited by examiner

Primary Examiner — Darlene P Condra
(74) Attorney, Agent, or Firm — LeClairRyan

(57) ABSTRACT

A stowing steering column is provided for use with an autonomous vehicle that is capable of traveling at a slower rate of speed and a higher rate of speed, depending on the situation. The slower speed, that of about 20 mm/sec, is the "standard" speed that is utilized during regular stowage and unstowage of the steering wheel under ordinary conditions. The higher rate of speed is necessary in a situation where a possible impact event is sensed and the steering wheel must be extended back to the original design intent position in case the airbags need to be deployed or the vehicle operator needs to over-ride the system for an evasive maneuver. The slower rate of speed is preferably about 20 mm/sec while the higher rate of speed is preferably about 40 mm/sec.

4 Claims, 6 Drawing Sheets

METHOD AND SYSTEM FOR STOWING STEERING COLUMN IN AN AUTONOMOUS VEHICLE

CROSS-REFERENCE TO RELATED APPLICATION

This application is a continuation-in-part of U.S. patent application Ser. No. 13/848,097, titled METHOD AND SYSTEM FOR STOWING STEERING COLUMN IN A VEHICLE, filed Mar. 21, 2013, which claims priority to U.S. Provisional Application No. 61/791,929, filed Mar. 15, 2013, both of which are hereby incorporated by reference in their entireties.

TECHNICAL FIELD

The disclosed invention relates generally to vehicle steering columns. More particularly, the disclosed invention relates to a steering column for particular application in an autonomous vehicle that can be axially translated to a given forward distance so that a driver might perceive an increase in vehicle roominess upon first entering the vehicle. Axial movement of the steering column has two situation-dependent speeds.

BACKGROUND OF THE INVENTION

Movable steering wheels and steering columns have been features of the automobile industry almost since its very beginning. For example, because of limited space between the steering wheel of the Ford Model T and the seat back and base accessory steering wheels were made available by after-market manufacturers that could be release and swung out of the driver's way upon entering and exiting the driver's seat. Later vehicles included steering columns that could be pivotably adjusted by a small amount to allow greater clearance for the driver between the steering wheel and the driver's seat.

Frequently, as in the case of the movable steering wheel accessory mentioned above, movement of the steering wheel is thought desirable, perhaps necessary, to allow some people to position themselves between the driver's seat and the steering wheel. In such instances movement of the steering wheel is done for practical reasons.

However, in other cases, it is desirable to move the steering wheel forward to the instrument panel to give the appearance of a larger vehicle interior as is often the case with today's increasingly popular smaller vehicle. This impression is particularly important in the vehicle showroom where the potential purchaser may be viewing the vehicle for the first time. In such circumstances the roomier appearance of the vehicle may be more favorably viewed by the driver and potential purchaser.

A number of constraints exist on movement of the steering wheel given passenger safety standards and packaging. With respect to occupant safety, considerations include crash loads (overturning moment) and load vs. displacement selections and the size and configuration of the internal steering components of the steering column. Particularly challenging in the design of an axially movable steering column is the need to separate the stowing or functional travel mechanism from the crash stroking plane.

Known systems for applying axial movement to the steering column fail to overcome the challenges faced both in terms of safety and of packaging. Such systems are limited to a typical axial travel of only about ±25 mm to either side of mid-line at a rate of about between about 10 and 20 mm/sec, making such systems impractical for use in stowing the steering column while the driver is out of the seat then extending the column quickly after the driver is seated. Accordingly, known systems are ineffective at providing convenient steering wheel stowage during normal operation of an autonomous vehicle or at providing steering wheel override by the vehicle operator if an impact event is sensed by the vehicle.

As in so many areas of vehicle technology there is always room for improvement related to stowable steering columns.

SUMMARY OF THE INVENTION

The disclosed invention overcomes several of the problems of the prior art by providing a stowing steering column that is capable of a high range of travel at a high rate of speed. The stowing steering column of the disclosed invention includes a roof bracket for attachment to the instrument panel, a sleeve attached to the bracket, and a steering column shaft movably attached to the sleeve. A steering wheel is fitted to an end of the steering column shaft.

The steering column shaft has a stowing travel range of between about +90 mm and +110 mm and a travel speed of between about 20 mm/sec and 40 mm/sec, or roughly double known rates. The stowing range of travel between about +90 mm and +110 mm is in addition to the functional vehicle-inward movement of +25 mm from mid-line.

The two speed steering column of the disclosed inventive concept may be used in any vehicle, but provides particular utility in the autonomous vehicle. The two-speed arrangement provided in the invention is an important feature during an emergency situation in which a potential impact is sensed by one or more of the vehicle's crash avoidance sensors. The slower speed, that of about 20 mm/sec, is the "standard" speed that is utilized during regular stowage and un-stowage of the steering wheel under ordinary conditions.

However, the higher speed, that of about 40 mm/sec, is necessary in a situation where a possible impact event is sensed and the steering wheel must be extended back to the original design intent position in case the airbags need to be deployed or the vehicle operator needs to over-ride the system for an evasive maneuver. Accordingly, in autonomous vehicles, it is important that two such very different speeds, the standard stowing speed of about 20 mm/sec and the higher emergency situation speed of about 40 mm/sec, be available.

The stowing steering column further includes a motor for axially adjusting the steering column shaft relative to the steering column sleeve.

The sleeve is pivotably attached to the roof bracket. The column further includes a steering column bracket extending from the roof bracket to which the steering column shaft is attached whereby the steering column bracket is adjustably movable with respect to the roof bracket. Optionally a motor may be provided for adjustably moving the steering column bracket with respect to the roof bracket.

The instrument panel is formed to define a steering-wheel receiving pocket into which the steering wheel will nest when in its retracted position. One or more sensors are provided for determining the position of the steering wheel relative to the instrument panel. The sensor may be selected from the group consisting of a hall current sensor, a potentiometer sensor, and a feedback sensor.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
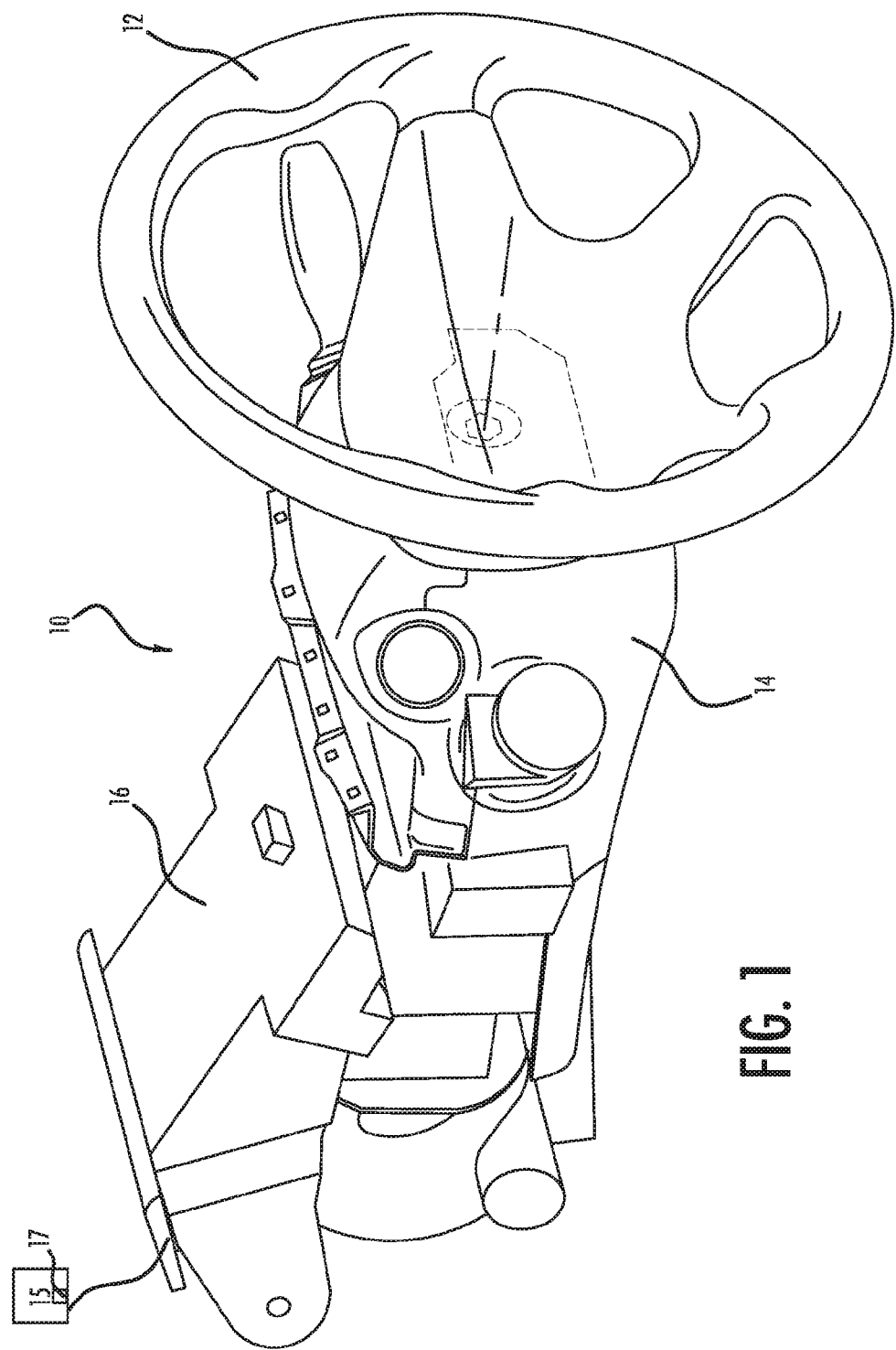
FIG. 1 shows a perspective view of a stowing steering column according to the disclosed invention.

In the following figures, the same reference numerals will be used to refer to the same components. In the following description, various operating parameters and components are described for different constructed embodiments. These specific parameters and components are included as examples and are not meant to be limiting.

In general, the disclosed invention provides a stowing steering column that is movable between an extended position for driver use and a retracted or stowed position when the driver is not present. With reference to FIG. 1, a perspective view of a stowing steering column, generally illustrated as 10, according to the disclosed invention is illustrated. The stowing steering column 10 includes a steering wheel 12, a cover or shroud 14, and a roof bracket 16 for attachment to the underside of an instrument panel. The stowing steering column 10 is associated with a crash avoidance sensor 15. The crash avoidance sensor 15 includes a signal generator 17 which is capable of generating a high speed travel signal to the stowing steering column 10. It is to be understood that the illustrated configurations of the stowing steering column 10 are for illustrative purposes only and that other shapes may be adopted without deviating from the spirit and scope of the disclosed invention.

Figure 2:
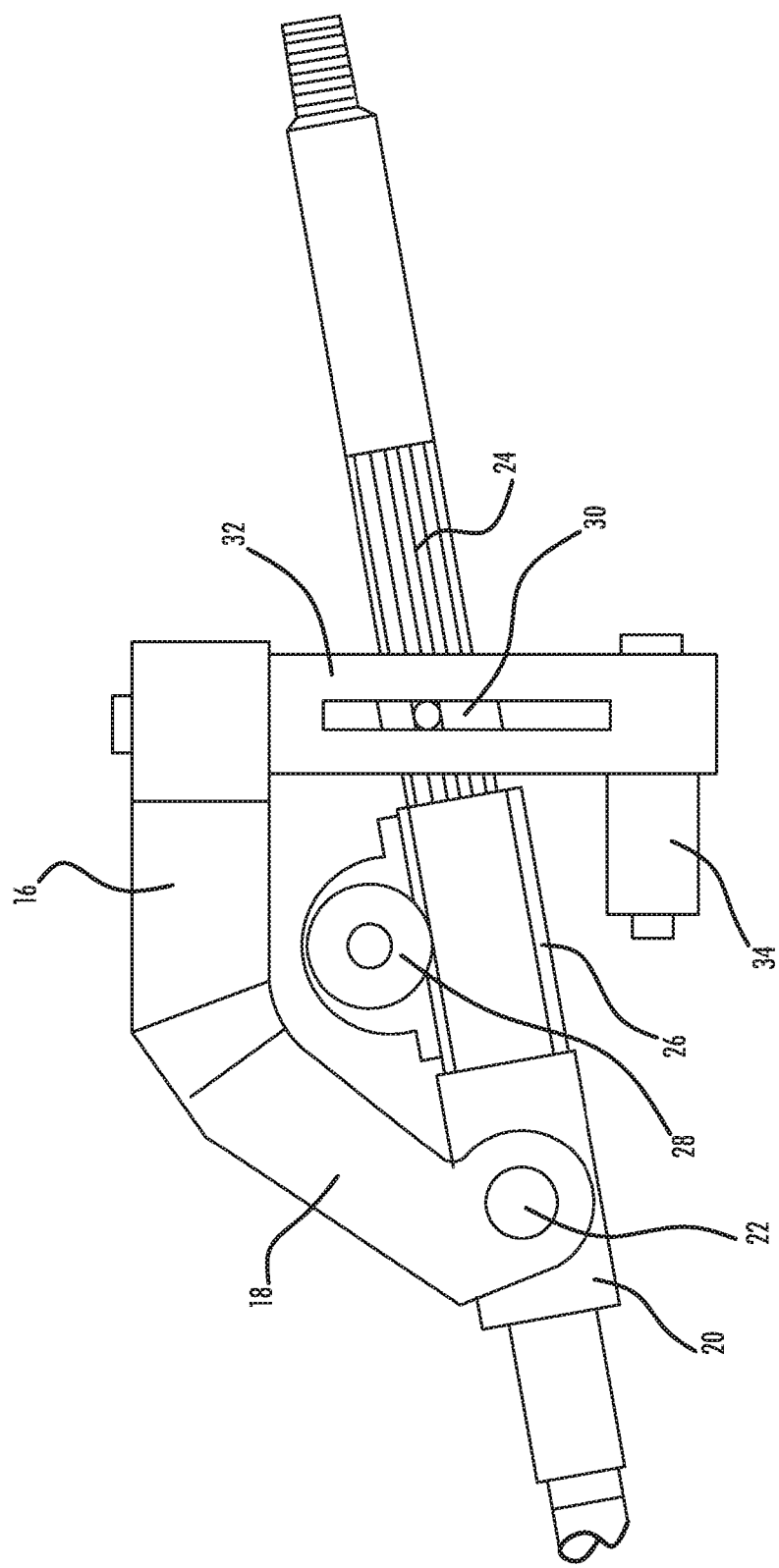
FIG. 2 illustrates a side view of components of the stowing steering column of the disclosed invention.

FIG. 2 illustrates a side view of components of the stowing steering column 10 of the disclosed invention with the cover or shroud 14 having been removed. The roof bracket 16 includes an extension arm 18. A shaft sleeve or shaft bracket 20 is pivotably attached to the extension arm 18 at a pivot assembly 22.

A powered steering shaft 24 is axially and movably provided within the shaft sleeve or shaft bracket 20. A drive motor support bracket 26 is provided in association with the shaft sleeve or shaft bracket 20. A drive motor 28 is operatively associated with the steering shaft sleeve 26.

The powered steering shaft 24 preferably has a stowing travel range of between about +90 mm and +110 mm and a travel speed of between about 20 mm/sec and 40 mm/sec. As noted above, the stowing range of travel between about +90 and +110 mm is in addition to the functional vehicle-inward movement of +25 mm from the mid-line. This wide range of travel and high speed movement allows for quick positioning and re-positioning of the steering wheel 12 as required for a given situation. Both degree of travel and speed of travel may be driver-adjusted according to personal preferences.

The powered steering shaft 24 may be splined or otherwise configured so as to allow operative engagement of the drive motor 28. Operation of the drive motor 28 allows the axial movement of the powered steering shaft 24 with respect to the shaft sleeve or shaft bracket 20.

The height of the steering wheel 12 (shown in FIG. 1) may be adjusted based on the comfort and practical requirements of the driver. A shaft bracket 30 is fitted to the powered steering shaft 24. The powered steering shaft 24 allows the shaft bracket 30 to rotate therein. The shaft bracket 30 is movably attached to a U-shaped bracket 32 that extends downwardly from the roof bracket 16. Horizontal adjustment of the powered steering shaft 24 is made by movement up or down of the shaft bracket 30 within the U-shaped bracket 32. Movement may be made manually or by an elevation adjustment motor 34.

The steering wheel 12 of the disclosed invention is selectively movable between an extended or in-use position when the driver is present and a stowed position when the driver is not present. A sensor provided in the driver's seat may be used to detect presence or absence of the driver from the driver's seat as is known in the art.

Figure 3:
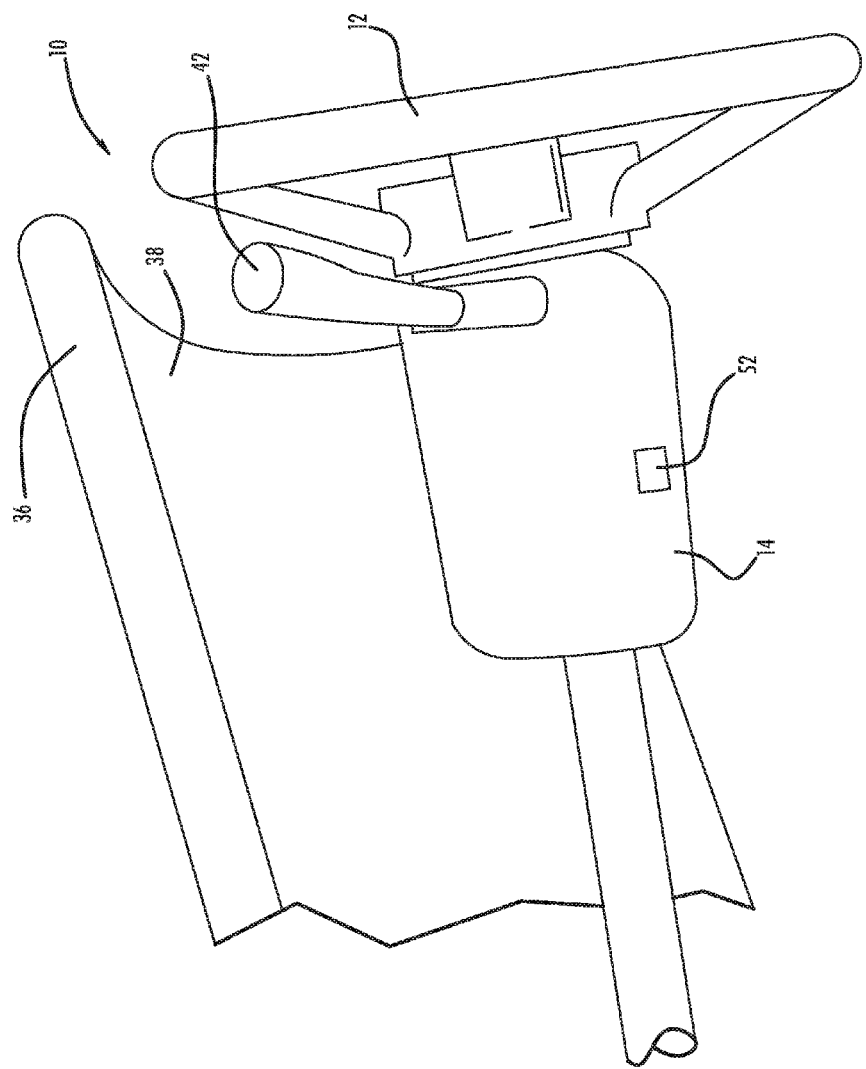
FIG. 3 illustrates a side view of the stowing steering column of the disclosed invention with the steering wheel in its retracted, stowed position.
Figure 4:
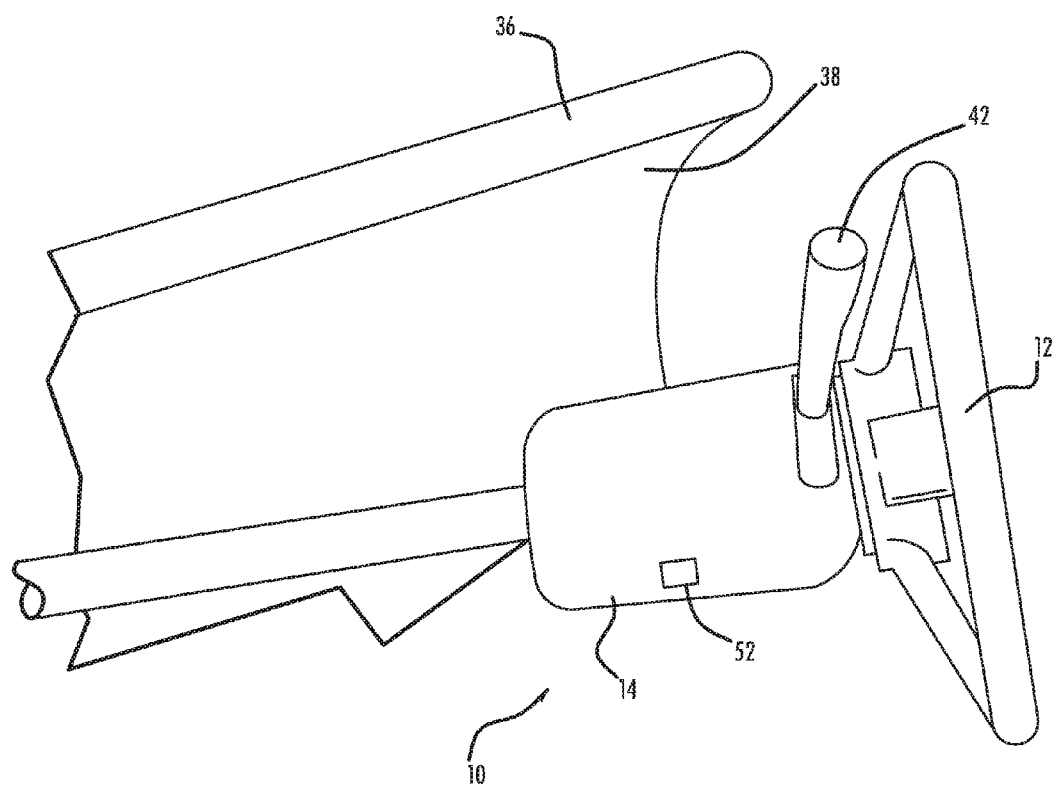
FIG. 4 illustrates a side view of the stowing steering column of the disclosed invention with the steering wheel in its extended position.

FIGS. 3 and 4 illustrate side views of the stowing steering column 10 between its stowed position and its extended, in-use position. In both figures, an instrument panel 36 is illustrated having an optional recessed, steering wheel-receiving area 38.

As illustrated in FIG. 3, the steering wheel 12 and the cover or shroud 14 are now in the stowed position and are close in relation to the instrument panel 36. This is the position that would be suitable to allow easy ingress and egress for the driver into and out of the driver's seat.

Figure 5:
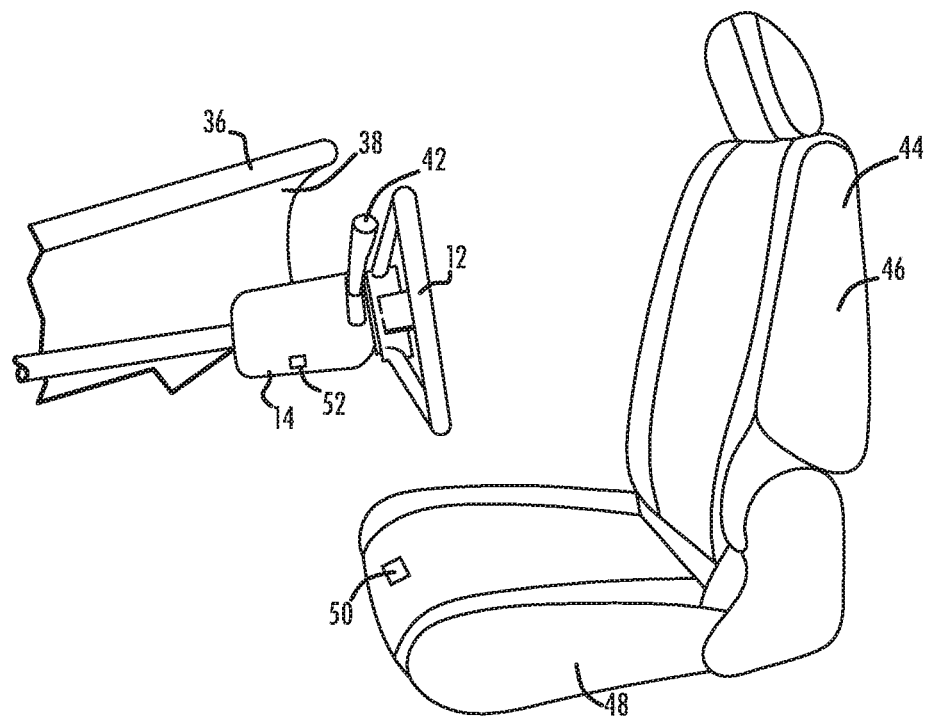
FIG. 5 is a side view of the stowing steering column of the disclosed invention with the steering wheel assembly relative to the driver's seat.

As illustrated in FIG. 4, the steering wheel 12 and the cover or shroud 14 are spaced apart from the instrument panel 36. This is the position necessary for the driver to operate the vehicle. As illustrated in FIG. 5, a driver's seat 44 is provided having a seat back 46 and a seat base 48. A seat base steering shaft position sensor 50 is fitted to the seat base 48. The seat base steering shaft position sensor 50 may be of any suitable type of sensor but may be selected from the group consisting of a hall current sensor, a potentiometer sensor, and a feedback sensor.

A steering shaft position sensor 52 is provided in relation to the stowing steering column 10. The steering shaft position sensor 52 is used to determine the position of the powered steering shaft 24 relative to the seat base steering shaft position sensor 50. The steering shaft position sensor 52 is operatively associated with the seat/column sensor provided in association with the driver's seat and, operating in conjunction with the drive motor 28, functions to assure that the powered steering shaft 24 is in the correct position relative to the seat base steering shaft position sensor 50 for a given operating situation. The steering shaft position sensor 52 may be of any suitable type of sensor but may be selected from the group consisting of a hall current sensor, a potentiometer sensor, and a feedback sensor.

Figure 6:
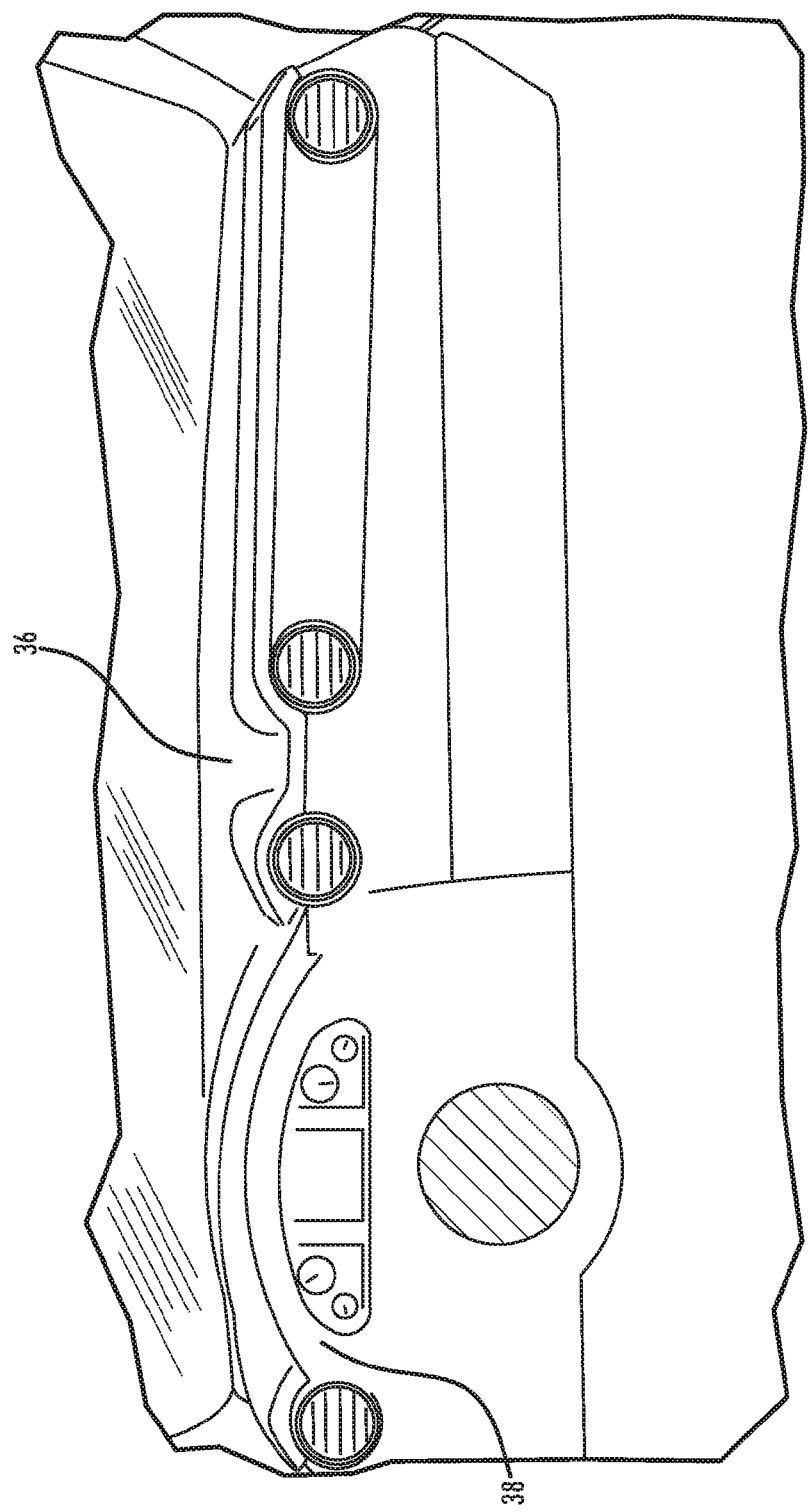
FIG. 6 is a front view of an instrument panel according to the disclosed invention that includes a recessed steering wheel-receiving area.

As noted above, optionally the steering wheel 12 may substantially nest within the optional recessed, steering wheel-receiving area 38 of the instrument panel 36. The recessed, steering wheel-receiving area 38 is illustrated particularly in FIG. 6. The shape and overall configuration of the recessed, steering wheel-receiving area 38 illustrated herein is suggestive and is not intended as being limiting.

Other features of the disclosed invention may be incorporated such as providing instrumentation either in relation to a multi-function switch stalk 42 (shown in FIGS. 3 and 4), to the steering wheel 12, or to both. Such steps may be necessary to allow for proper stowing of the steering wheel 12.

In operation in a non-autonomous vehicle, the steering wheel 12 would normally be in its stowed position as illustrated in FIG. 3 when the vehicle is off (ignition key is removed) or when no driver is detected in the driver's seat. By having the steering wheel 12 in its stowed position an appearance of openness is created within the interior of the vehicle. Once the driver is seated in the driver's seat and the ignition is turned on the drive motor 28 is engaged and the steering wheel 12 is moved quickly to its extended, in-use position as shown in FIG. 4.

In operation in an autonomous vehicle, the steering wheel 12 may be moved to its stowed position as illustrated in FIG. 3 at its slower speed under ordinary circumstances and moved to its extended, in-use position illustrated in FIG. 4 in the event that the vehicle's crash avoidance sensors identifies a potential impact situation. By providing a "standard" slower speed, that of about 20 mm/sec, regular stowage and un-stowage of the steering wheel can be undertaken during ordinary conditions.

However, when the autonomous vehicle's crash avoidance sensors identify a possible impact, the steering column is moved at the higher speed of about 40 mm/sec, thereby expeditiously extending the steering wheel back to its original design intent position in case the airbags need to be deployed or the vehicle operator needs to over-ride the system for an evasive maneuver.

The position of the powered steering shaft 24 is determined by the steering shaft position sensor 40. When the powered steering shaft 24 has been extended to its in-use position, the axial movement of the powered steering shaft 24 caused by the drive motor 28 is stopped.

When the vehicle ignition is turned off (ignition key removed) the drive motor 28 is again engaged and the powered steering shaft 24 is moved away from the driver toward its stowed position. When the steering shaft position sensor 40 determines that the powered steering shaft 24 is in its proper position, the axial movement of the powered steering shaft 24 caused by the drive motor 28 is stopped.

As an alternative to the arrangement described above, the driver may manipulate an ignition switch or button (such as an ignition button) to thereby engage the drive motor 28 to thereby move the steering wheel 12 vehicle forward into its stowed position. The steering wheel 12 would remain in its stowed position until the driver again manipulates the ignition switch or button to its off position.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An axially movable steering column for an autonomous vehicle, the column comprising:
   a bracket;
   a sleeve attached to said bracket;
   a steering column shaft movably attached to said sleeve, said shaft being movable from a stowed position to an extended position at high or low travel rates, wherein said high travel rate is about 40 mm/sec and said low travel rate is about 20 mm/sec; and
   a crash avoidance sensor operatively associated with said shaft, said sensor including a signal generator to generate a high speed travel signal to said shaft.

2. A steering arrangement for an autonomous vehicle, the arrangement comprising:
   an instrument panel;
   a steering column having an axially movable steering column shaft and a steering wheel attached to said shaft, said shaft being movable to a stowed position when the vehicle is parked and to an extended position for operation by a driver, said shaft being movable to said extended position at a high travel rate or a low travel rate wherein said high travel rate is about 40 mm/sec and said low travel rate is about 20 mm/sec;
   a crash avoidance sensor operatively associated with said shaft, said sensor including a signal generator to generate a high speed travel signal to said shaft.

3. A method of positioning a steering wheel in an autonomous vehicle, the method comprising:
   forming an instrument panel, a steering column having an axially movable shaft and a crash avoidance sensor operatively associated with said shaft, said shaft being movable to a stowed position when the vehicle is parked and to an extended position for operation by a driver, said shaft being movable to said extended position at a high travel rate or a low travel rate, wherein said high travel rate is about 40 mm/sec and said low travel rate is about 20 mm/sec;
   moving said shaft at said high travel rate when said crash avoidance sensor senses a possible impact; and
   moving said shaft at said low travel rate at all other times.

4. The method of positioning a steering wheel for an autonomous vehicle of claim 3 wherein said shaft has a stowing range of travel between about +90 mm and +110 mm from mid-line.

* * * * *